Nov. 14, 1967  A. A. GARRA  3,352,223
APPARATUS FOR DETERMINING THE ATTITUDE
AND DISTANCE BETWEEN TWO BODIES
Filed Sept. 21, 1964
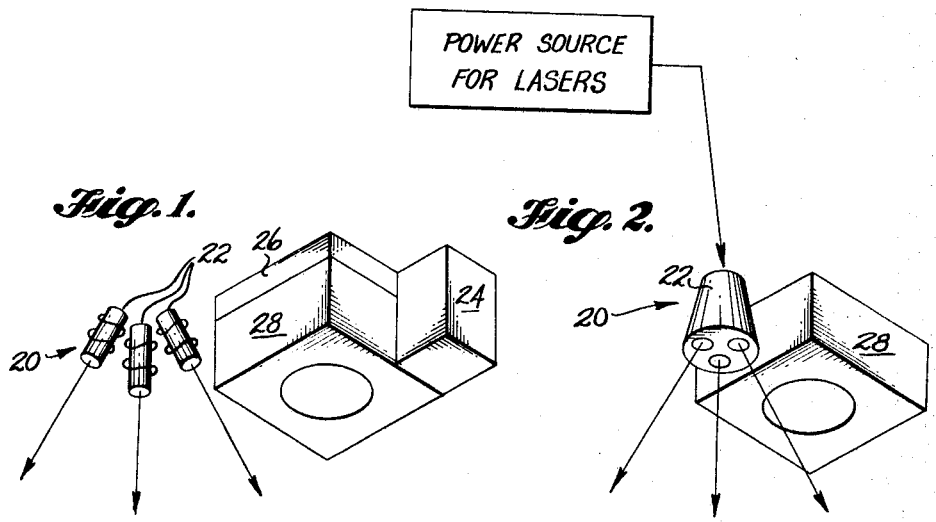
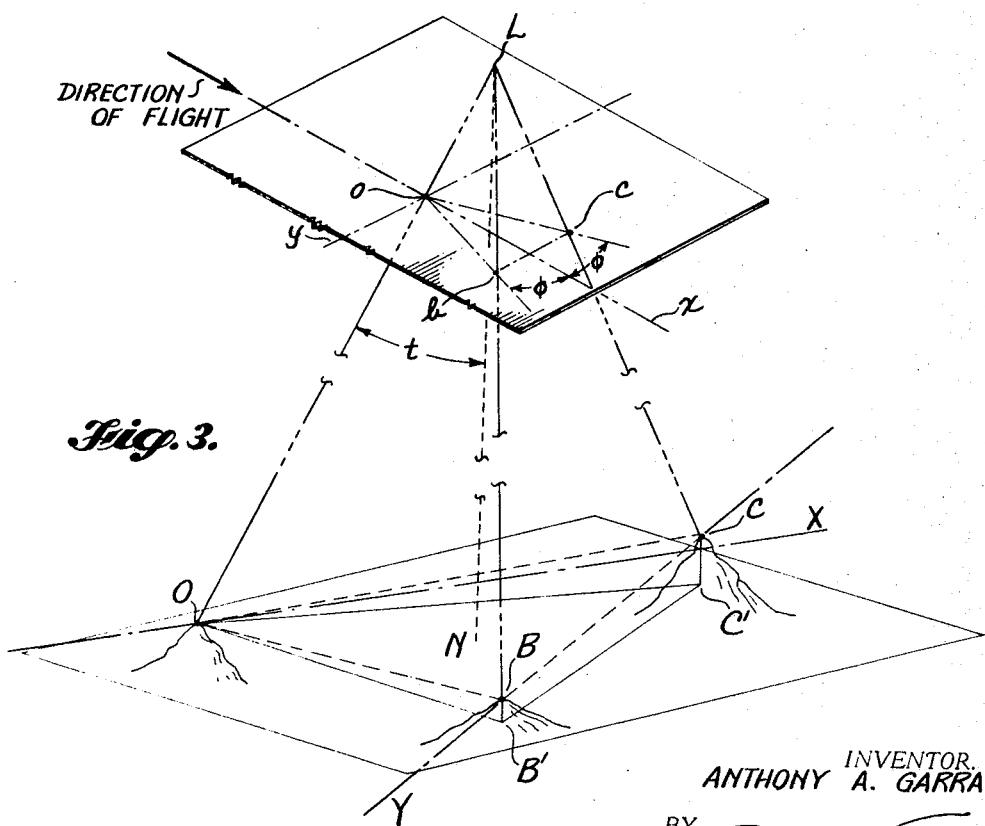
INVENTOR.
ANTHONY A. GARRA
BY Erwin F. Adams
ATTORNEY

United States Patent Office 3,352,223
Patented Nov. 14, 1967

3,352,223
APPARATUS FOR DETERMINING THE ATTITUDE AND DISTANCE BETWEEN TWO BODIES
Anthony A. Garra, Bellevue, Wash., assignor to The Boeing Company, Seattle, Wash., a corporation of Delaware
Filed Sept. 21, 1964, Ser. No. 397,884
5 Claims. (Cl. 95—12.5)

This invention relates to an apparatus for determining the attitude and distance between a vehicle and a body and more particularly to an apparatus using coherent electromagnetic radiation for determining the attitude and local vertical distance of a vehicle with respect to a body.

Recent developments in space exploration, as well as military and commercial applications, have demanded a system by which vehicle altitude and attitude with respect to a body may be found without relying on ground-based aids. Such a system, for example, when used in an aerospace vehicle, in combination with an imagery device would be highly useful in obtaining terrain data of a planet which has not been explored by man or for mapping ground areas in a military combat zone where no ground control may be obtained. The term "aerospace vehicle" is used herein to refer to vehicles which are used in the earth's atmosphere, such as an aircraft, and to space vehicles which are used outside of the earth's atmosphere and in the vicinity of another planet.

Another problem of a different but related type is the need of a system which will facilitate rendezvous and docking of two space vehicles. The principal difficulty encountered in a rendezvous operation is to provide continuous data acquisition of attitude and closing velocity between the two vehicles. Attitude determination is required, for example, in order to provide an orientation from which vehicle control forces may be referenced and closing velocity data is necessary to control the approach rate of the vehicles.

The term "body" as used herein is meant to include a vehicle, as well as a planet, satellite (natural or artificial), or other heavenly body.

It is an object of this invention to provide a method and apparatus for completely determining the attitude and distance between a vehicle and a body without relying on any other data relating to the body.

Another object of the present invention is to provide a method and apparatus for collecting visual representations of at least a portion of a body and independently determining the attitude and altitude of an aerospace vehicle carrying the apparatus with respect to the portion of the body visually represented.

A further object of the present invention is to provide an apparatus including an imagery device and a measuring device using coherent electromagnetic radiation for obtaining visual terrain representations and accurate, controlled terrain mapping and scale data for such representations without relying on other terrain information.

A still further object of the present invention is to provide a method and apparatus for continuous acquisition of attitude and closing velocity data to facilitate rendezvous and docking of two space vehicles.

Further objects of the invention will be obvious in part and in part will appear hereinafter.

For a fuller understanding of the nature and objects of the invention, reference should be had to the following detailed description taken in conjunction with the accompanying drawings wherein:

FIGURE 1 is a perspective schematic view of an apparatus for determining attitude and distance and for obtaining visual representations for use in an aerospace vehicle;

FIGURE 2 is a perspective schematic view of another embodiment of an apparatus for determining distance and attitude; and FIGURE 3 is a perspective view showing the geometry of the method for determining the attitude and distance of a vehicle with respect to a body having an irregular terrain, including calibration geometry of the apparatus and the necessary computational geometry.

The present invention may be best described with respect to an apparatus for use in an aerospace vehicle for obtaining visual representations of a portion of the terrain of a body and for determining the attitude and altitude of the vehicle with respect to the portion of the visually represented. The apparatus includes an imagery device which is meant herein to refer to photographic devices, such as movie and frame cameras, and to image broadcasting devices such as television cameras. In combination with the imagery device, there is provided means for determining the altitude and attitude of the vehicle comprising means for simultaneously transmitting or sending pulses of coherent electromagnetic radiation along three axes and means for receiving pulses reflected from a body and for measuring the time elapsed between sending and receiving of each pulse.

One embodiment of the above described apparatus is shown in FIGURE 1 comprising a laser system 20 including three laser means or optical masers 22 which are adapted to simultaneously send pulses of coherent electromagnetic radiation along three axes which define a trihedron. Receiving means 24, which may comprise photomultiplier detectors, bandpass interference filters or various types of optical systems well known in the art is carried by the vehicle and is adapted to receive the pulses reflected from a body. Also disposed within the vehicle is means 26 for measuring the time elapsed between the sending and receiving of each pulse. The geometry of the trihedron permits the computation of vehicle attitude and height above the surface of the body, as explained in detail hereinafter. The imagery device in this embodiment is a frame camera 28 having a lens, shutter and a photographic format (an opening in a plane parallel to the sensitized surface on which the image is produced). The sensitized surface or photograph is provided with fiducial marks on its four sides, which when connected by straight lines, form the fiducial axes of the photograph. The intersection of these axes define the principal point $o$ of the photograph and the mechanical center of the photographic format.

The laser system 20 is fixedly mounted or slaved to the camera 28 in a particular relationship, with respect to the camera fiducial axes, described more fully hereinafter, which provides the necessary calibration geometry. As previously explained, the axes of the three lasers are oriented so that the laser beams form a trihedron having an apex L, as shown in FIGURE 3. The apex L is in the same plane as the lens of the camera and this plane is parallel to the photographic format. The focal point of the camera lens is on the camera optical axis which perpendicularly intersects the photograph at principal point $o$ and is displaced from the apex L an extremely small amount relative to the distance between the camera lens and the surface photographed. The focal point and the apex L, therefore, may be assumed to be at the same point without introducing any error of consequence, although this error can be computed and corrected for if necessary.

The orientation of the trihedron is such that the laser beams intersect the photographic format within the area of photographic coverage and are fixed with respect to the fiducial axes. This is required to identify where the laser beams reflect from the surface and to establish the geometry necessary to find the tilt and altitude of the vehicle above the surface photographed. The simplest arrangement, shown in FIGURE 3, is to orient the laser system so that one beam or trihedron leg passes through the principal point o of the photograph. The points b and c are located with respect to the fiducial axes so that angles $\phi_1$ and $\phi_2$ are known. Point b and c represent the ground points B and C where the laser pulses are reflected from the terrain. It is to be understood that the plane containing points o, b and c, shown in FIGURE 3, is not the photograph but a plane parallel to the photographic format to illustrate the geometry of the system. The fiducial x-axis is arranged so as to be in the direction of movement of the aerospace vehicle.

In operation, the camera shutter exposing the photograph is simultaneously operated with the sending of pulses from the laser system. Receiving the pulses reflected from the terrain permits the calculation of the trihedron legs, LO, LB and LC. Since the apex angles of the trihedron are fixed and known, the tilt and altitude of the vehicle relative to the terrain photographed may be determined as follows. The sides OC, BC and OB of the base triangle are found from the law of cosines:

$$OC = \sqrt{LC^2 + LO^2 - 2LCLO \cos OLC}$$

$$BC = \sqrt{LC^2 + LB^2 - 2LCLB \cos BLC}$$

$$OB = \sqrt{LB^2 + LO^2 - 2LBLO \cos OLB}$$

A ground or base coordinate system is arbitrarily established so that the Y-axis passes through points B and C and the X-axis is perpendicular thereto and passes through point O. The coordinates of points O, B and C are found with respect to this system as follows:

| Point | X | Y | Z |
|-------|----|----|----|
| O | XO | 0 | 0 |
| B | 0 | YB | 0 |
| C | 0 | YC | 0 | where $$XO = -\sqrt{OB^2 - \frac{(OC^2 - BC^2 - OB^2)^2}{4BC^2}}$$

$$YB = \frac{OC^2 - BC^2 - OB^2}{2BC}$$

and $$YC = \frac{OC^2 + BC^2 - OB^2}{2BC}$$

The ground plane OBC includes nadir point N which is a local vertical projection of apex L on this plane. Computation of LN, therefore, will yield the perpendicular distance of apex L above the ground plane and thus the altitude of the camera lens. In terms of the arbitrary ground coordinate system, and further, a space coordinate system where the Z-axis is perpendicular to the XY plane, the coordinates of L may be expressed as XL, YL and ZL. The coordinates for L may be found from the following:

$$ZL = \left[ LO^2 + \left( \frac{LBLO \cos OLB - LCLO \cos OLC}{YC - YB} \right)^2 + \left( \frac{(YC - YB)LO^2 - YCLBLO \cos OLB + YBLCLO \cos OLC}{-XO(YC - YB)} \right)^2 \right]^{-1/2}$$

$$XL = XO + \frac{(YC - YB)LO^2 - YCYBLO \cos OLB + YBLCLO \cos OLC}{-XO(YC - YB)}$$

$$YL = \frac{LBLO \cos OLB - LCLO \cos OLC}{YC - YB}$$

The altitude or local vertical distance between the apex L of the trihedron (and therefore of the vehicle, generally) and the base plane OBC is equal to ZL. The tilt may be computed from $\cos t = ZL/LO$.

The coordinates XL and YL are also the ground coordinates for the nadir point N and are used to translate the coordinates of N to the photo coordinate system during the mapping process. Proper location of point N on the photo is required for correction of tilt distortion according to standard photogrammetric techniques.

FIGURE 3 also illustrates that local irregularities may exist on the planet surface within the area represented in the photographs. If the laser pulses are reflected from the terrain at one of these irregularities (for example, mountains, craters, etc.) it is apparent that the base plane of the trihedron will not be coplanar with the general terrain surface. Correction for the tilted plane due to relief, however, may be obtained by standard photogrammetric procedures. By use of overlapping photography, stereophotogrammetric instruments may be used to identify the elevations from a general terrain surface or datum plane at various points in the photograph. The coordinates of points L, O, B and C in the arbitrary X–Y coordinate system, previously referred to, may be transferred to a photograph coordinate system so that coordinates of these points may be established on the photo. It is to be understood that by suitable modification of the above equations, the corrections may be directly accounted for.

The above described laser system in combination with an imagery device when used in aerospace vehicle will therefore be seen to provide the necessary information for rectification of the photographs taken without relying on any other terrain information. It should be understood, however, that the laser system may be used wholly independent of an imagery device, such as where the body from which vehicle altitude and attitude is to be referenced is relatively free of surface irregularities or where the accuracy required does not warrant extensive correction by stereophotogrammetric techniques.

It should also be understood that the imagery device in the above described combination may be a continuous image device, such as a television system. This apparatus is particularly adaptable to space vehicle rendezvous operations wherein the apex angles of the laser trihedron are varied as indicated by the television monitor image until all laser pulses are reflected from the other vehicle. The angles are then fixed and the values are provided to a suitably pre-programmed computer to which is also fed the pulse elapsed-times for continuously computing the attitude and distance and subsequently the closing velocity.

I have provided a method and apparatus for independently determining the attitude and distance of an aerospace vehicle from another body and while the invention has been described in connection with several preferred embodiments thereof, it is to be understood that this description is illustrative only and is not intended to limit the invention, the scope of which is defined by the appended claims.

I claim:
1. An apparatus for use in an aerospace vehicle for obtaining visual representations of a body and for determining the vehicle attitude and local vertical distance with respect to the body comprising: photographic means including a lens, shutter and a photographic plate, laser means mounted to said photographic means for simultaneously sending three pulses of coherent electromagnetic radiation along three axes arranged so as to define a trihedron having its apex at said lens and having known apex angles, means for simultaneously sending said three pulses and exposing said photographic plate, means for receiving pulses reflected from said body and means for measuring the time elapsed between sending and receiving each of said pulses.

2. An apparatus for use in an aerospace vehicle for obtaining photographs of a body and for determining the attitude and distance of the vehicle with respect to the body photographed comprising in combination, a camera including a lens and a shutter for exposing a photograph, laser means fixedly mounted relative to said camera and including a source for producing three laser pulses, each of said laser pulses directed toward said body and along axes disposed so as to define a trihedron having its apex proximate said camera lens and its base within the area of photographic coverage, means for operating said laser means to send three pulses from said laser source and simultaneously operate said camera shutter so as to expose said photograph, and means for receiving each laser beam pulse reflected from the body and measuring the time elapsed between sending and receiving each pulse.

3. An apparatus for use in an aerospace vehicle for obtaining photographs of a portion of a planet and for determining the attitude and true vertical distance between the vehicle and the photographed portion of the planet comprising in combination, a camera including a lens and shutter for exposing a photograph, three laser pulse sending means fixedly mounted to said camera, each of said sending means operable so as to direct a pulse along an axis, said axes disposed so as to define a trihedron having its apex proximate said camera lens and a base plane defined by three points on the photographed portion of said planet, each of said points being the point at which a laser pulse strikes the photographed portion of said planet, means for simultaneously operating said pulse sending means and said camera shutter to expose said photograph and means for receiving each laser pulse reflected from the photographed portion of the body and measuring the time elapsed between sending and receiving each pulse.

4. An apparatus for use in an aerospace vehicle for obtaining visual representations of a planet surface and determining the attitude and local vertical distance between the vehicle and the portion of the planet surface visually represented comprising, a camera including a lens and a shutter for exposing a photograph having fiducial axes defining a principal point, laser means fixedly mounted relative to said camera and including three laser pulse sending means, each of said pulse sending means having an axis, said axes disposed so as to define a trihedron having its apex at said camera lens, one of said axes intersecting the photograph principal point, said trihedron having a base plane defined by three points on the planet surface to be visually represented, each of said points representing the intersection of one of said pulse sending means axes with the planet surface, means for simultaneously operating said pulse sending means and said camera shutter to expose said photograph and means for receiving each laser pulse reflected from the planet surface and measuring the time elapsed between sending and receiving of each individual pulse, whereby true scale mapping measurements may be obtained without the use of ground based aids.

5. An apparatus for use in an aerospace vehicle for ascertaining the attitude and local vertical distances between the vehicle and multiple points on a body comprising in combination:
  (a) means for simultaneously sending three pulses of coherent electromagnetic radiation along three axes,
  (b) said axes disposed so as to define a trihedron,
  (c) means for receiving each of said pulses of coherent electromagnetic radiation reflected from the body, and
  (d) timing means operatively connected to said sending means and said receiving means, for measuring the time elapsed between sending and receiving of each of said pulses.

References Cited
UNITED STATES PATENTS
3,184,736   5/1965   Badewitz _____ 343—5

JOHN M. HORAN, *Primary Examiner.*